United States Patent [19]
Griffith et al.

[11] 4,016,687
[45] Apr. 12, 1977

[54] ANGULAR ADJUSTMENT FOR DRILL RIG MAST

[75] Inventors: T. W. Griffith, Dallas; Arthur T. Taylor, Carrollton, both of Tex.

[73] Assignee: Gardner-Denver Company, Dallas, Tex.

[22] Filed: Nov. 13, 1975

[21] Appl. No.: 631,771

Related U.S. Application Data

[63] Continuation of Ser. No. 527,120, Nov. 25, 1974, abandoned.

[52] U.S. Cl. .................................... 52/116; 52/118; 173/43
[51] Int. Cl.$^2$ ......................................... E04H 12/34
[58] Field of Search ............ 52/115, 116, 117, 143, 52/118; 173/42, 43; 248/2

[56] References Cited

UNITED STATES PATENTS

| | | | |
|---|---|---|---|
| 1,395,895 | 11/1921 | Bellony | 173/43 |
| 2,660,268 | 11/1953 | Selberg | 52/115 X |
| 2,689,549 | 9/1954 | Hayman | 52/115 X |
| 2,904,310 | 9/1959 | Leonard | 173/43 X |
| 3,033,527 | 5/1962 | Wilson | 52/116 X |
| 3,245,180 | 4/1966 | Bules et al. | 52/116 |
| 3,332,181 | 7/1967 | Carlson | 52/117 |
| 3,768,575 | 10/1973 | Mackinnon et al. | 173/43 |
| 3,783,953 | 1/1974 | Kopaska | 173/43 X |

*Primary Examiner*—Price C. Faw, Jr.
*Assistant Examiner*—Leslie Braun
*Attorney, Agent, or Firm*—Michael E. Martin

[57] ABSTRACT

The mast of a portable earth drilling rig is mounted for pivotal movement between a horizontal transport position and selected drilling positions. A series of radially spaced apart lateral projections on each side of the lower end of the mast are provided with apertures for engaging laterally extending projections disposed on a pair of telescopic braces mounted on the rig frame. The braces may be selectively positioned for automatic engagement with a predetermined pair of projections on the mast whereby the mast, for drilling, may be positioned in the desired angular attitude.

6 Claims, 5 Drawing Figures

ANGULAR ADJUSTMENT FOR DRILL RIG MAST

This is a continuation of application Ser. No. 527,120 filed Nov. 25, 1974, now abandoned.

BACKGROUND OF THE INVENTION

This invention relates to earth drilling rigs which are characterized by a mobile support or chassis upon which is mounted the drilling equipment and an elongated mast that is disposed for pivotal movement between a substantially horizontal transport position and an erect position for performing drilling operations.

In many drilling operations it is required that holes be drilled at various angles other than in the vertical direction and accordingly the drill rig may be provided with means for positioning the mast to provide the desired angular direction of the drill stem. Generally, prior art mounting arrangements for drilling slant holes have been characterized by telescoping braces and the like or other means wherein two relatively movable members are provided with a plurality of spaced openings in which pins are inserted once the openings in one member are aligned with the corresponding openings in the other member. Such arrangements are cumbersome and difficult to operate for selecting a predetermined angular position of the mast and they often require an assistant to the drill operator who must insert the locking pins while the operator handles the controls for the mast raising cylinders or the like to position the mast in the desired angular attitude.

SUMMARY OF THE INVENTION

The present invention provides an improved arrangement for positioning the mast of a portable drilling rig for drilling holes in a plurality of angular attitudes including the vertical direction. With the angle adjustment mechanism of the present invention a pivotally mounted mast of a mobile drilling rig may be easily raised from a substantially horizontal transport position to a selected one of a plurality of angular drilling positions and secured in said one position with a minimum of effort. The drilling angle adjustment mechanism of the present invention also may be operated to predetermine the desired angular position of the mast prior to raising the mast whereby as the mast is raised from the transport position it is automatically stopped at the desired angular setting. The angle adjustment mechanism of the present invention also provides for relieving at least some of the supporting load on the mast raising and lowering actuators or cylinders while the mast is in drilling position.

With the drilling angle adjustment mechanism of the present invention the mast of a portable drilling rig may be raised to a preselected angular drilling position by an operator actuating suitable remote controls whereby the mast may be positioned in a more rapid and efficient manner than with heretofore known arrangements.

DESCRIPTION OF THE PREFERRED EMBODIMENT

Figure 1:
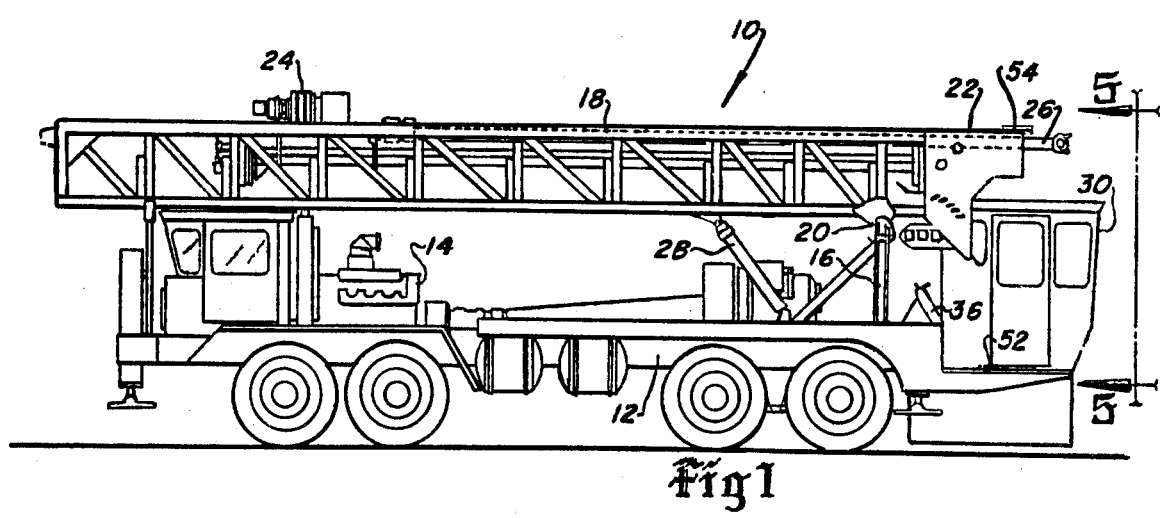
FIG. 1 is a longitudinal side elevation of a mobile drilling rig including the mast angular adjustment mechanism of the present invention.

Referring to FIG. 1 of the drawings a mobile earth drilling rig is illustrated and generally designated by numeral 10. The drilling rig 10 is characterized by a self-propelled rubber tired vehicle having a frame 12 and an engine 14 for propelling the rig as well as providing power for drilling operations. The frame 12 includes a pair of spaced apart upstanding support members 16, see FIG. 5, for supporting the lower end of an elongated mast 18. The mast 18 includes a pair of laterally extending trunnions 20 which are journalled in suitable bearing means mounted on the supports 16. The mast 18 is of a conventional built-up truss type and includes spaced apart gussets 22 on each of the lateral sides near the lower end of the mast. A drill motor 24 is disposed for reversible movement along the mast 18 for axial feeding and rotation of a drill stem 26.

Figure 3:
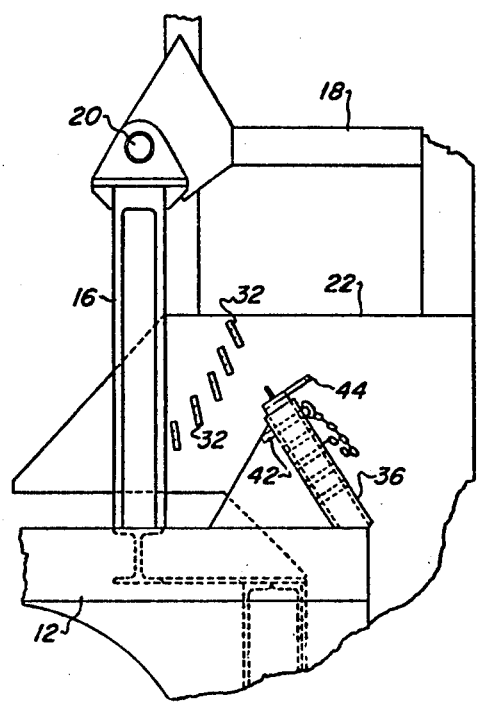
FIG. 3 is a fragmentary side elevation showing the mast in a vertical drilling position.

The drill rig 10 also includes a pair of extensible hydraulic linear actuators or cylinders 28, one shown in FIG. 1, disposed on the frame 12 and connected to the mast 18 for raising and lowering the mast between a substantially horizontal transport position shown in FIG. 1 and a plurality of substantially erect positions required for drilling operations. The cylinders 28 may be actuated from an operator's control station 30 by suitable remote controls for extending and retracting the cylinders in a conventional manner. The cylinders 28 are capable of raising the mast 18 to a substantially vertical position with respect to the frame 12 as shown in FIG. 3. However, in many earth drilling operations it is desirable to drill at an angular attitude other than the vertical. Conversely, it is not always possible to position the rig itself so that a hole may be drilled vertically when the mast is in the fully erect position with respect to the frame. Moreover, although the mast 18 may be positioned in an angular attitude by the cylinders 28 it is desirable to relieve, at least partially during drilling operations, the reaction forces exerted on the cylinders caused by the drilling operations as well as the forces caused by the weight of the mast itself. Additionally, it is desirable to provide means for positively positioning the mast in a predetermined angular attitude.

Referring to FIGS. 2 through 5 the mast 18 is provided with a plurality of laterally projecting stop members 32 disposed on each of the gussets 22. The members 32 include apertures 34 formed therein. The members 32 are also spaced apart at progressively greater distances radially with respect to the pivot axis of the mast 18. The members 32 are formed as substantially flat platelike lugs each having a longer side lying in a plane which passes through the pivot axis formed by the trunnions 20. The members 32 may be welded on the gussets 22 or otherwise suitably attached thereto.

The angular adjustment mechanism of the present invention is also characterized by spaced apart hollow leg members 36 mounted on the frame 12 on each side of the mast 18. The legs 36 are formed by hollow rectangular tubular members which project upwardly generally toward the pivot axis of the mast 18. The legs 36 are adapted to receive extensible brace members 38 which are formed to fit inside the legs in slidable telescoping relationship thereto. The members 38 are each provided with a plurality of spaced apart transverse holes 40 which may be selectively aligned with suitable openings in the legs 36 for insertion of locking pins 42 whereby the members 38 can be disposed in a plurality of positions with respect to the legs 36 and the mast 18.

Figure 2:
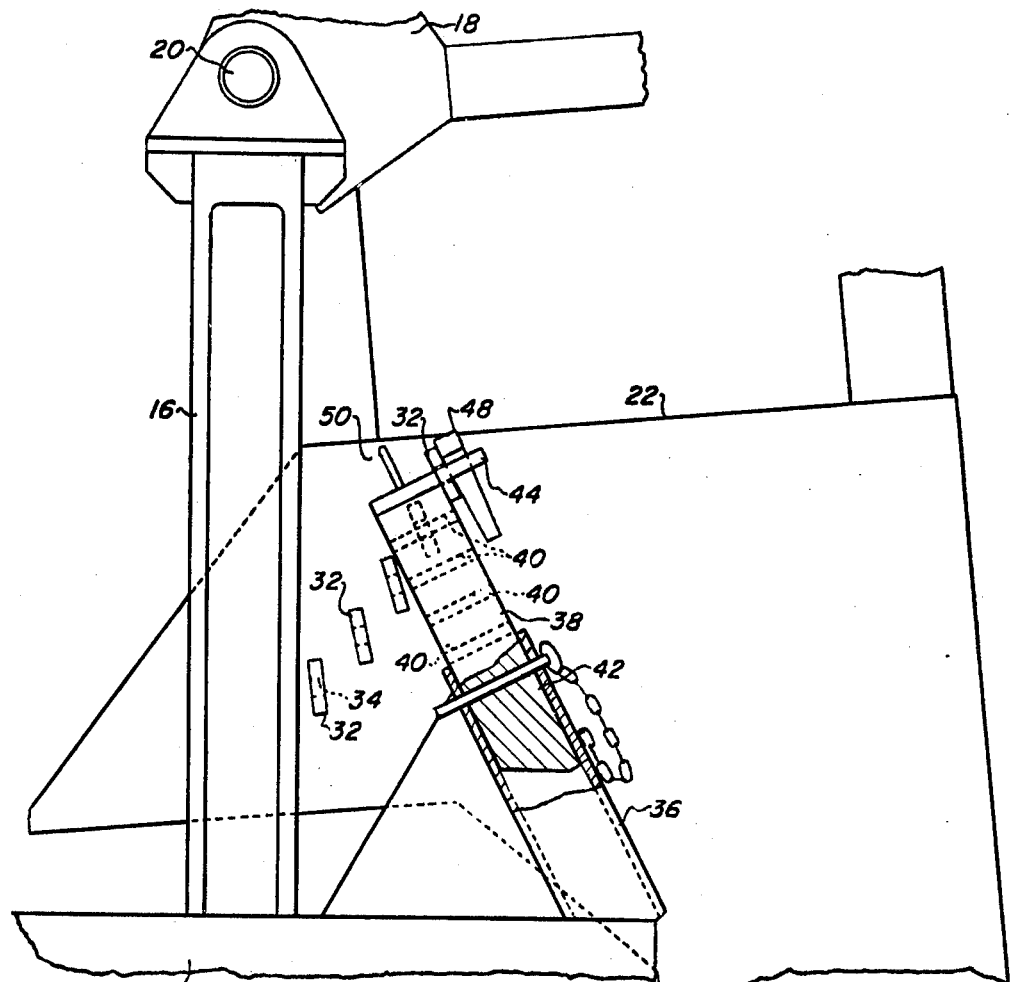
FIG. 2 is an enlarged fragmentary side elevation of the mast of the drill rig of FIG. 1 showing the angle adjustment mechanism in partial section.
Figure 5:
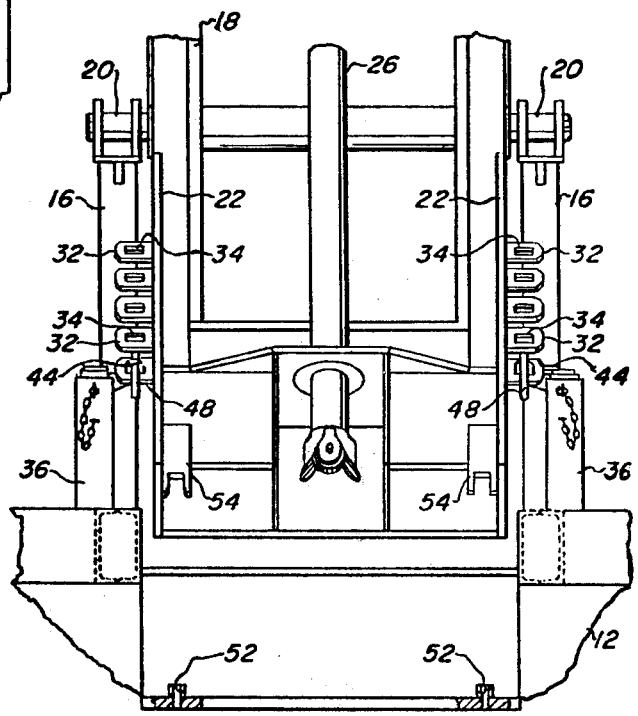
Figure 4:
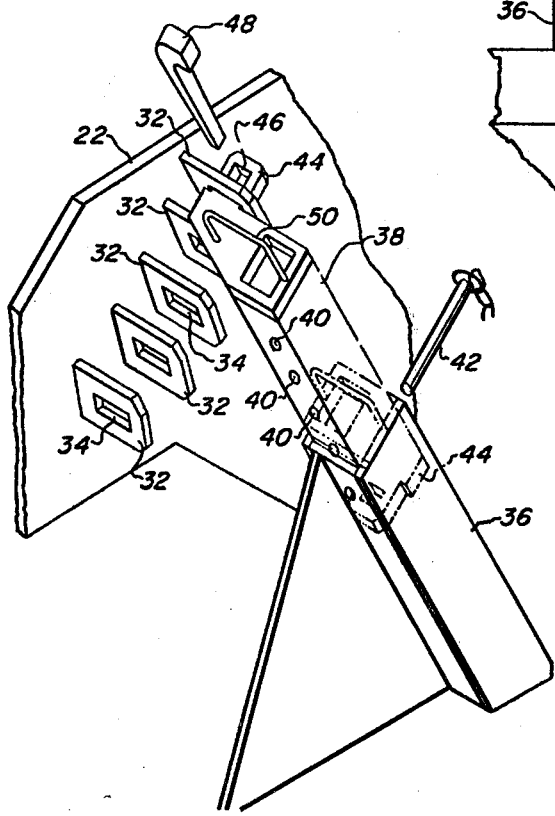
FIG. 4 is a perspective view showing the components of the angle adjustment mechanism on one side of the mast; and, FIG. 5 is a view of the mast in the maximum angular position and is taken from the line 5—5 of FIG. 1.

The upper end of each member 38 is provided with a generally L-shaped platelike tongue 44 which may be disposed to project into the aperture 34 of one of the members 32 as shown in FIGS. 2, 4 and 5. The tongues 44 are provided with apertures 46 into which wedge shaped pins 48 may be inserted to lock the mast 18 in a selected position. As may be appreciated from viewing the drawing, FIGS. 2, 4, and 5, the laterally projecting tongues 44 of the members 38 may be engaged with any of the members 32 depending on the position of the members 38 with respect to the supporting legs 36. In this way the mast 18 may be raised and locked in a predetermined angular position with respect to the rig 10 whereby the attitude of the drill stem 26 may be selected in accordance with the desired direction of drilling. With the arrangement of the spaced apart legs 36 and the radially spaced apart and laterally extending members 32 which are engageable with the tongues 44 the desired angular position of the mast 18 may be selected. Accordingly, as the mast 18 is raised from the horizontal transport position it is automatically stopped by the engagement of the tongues 44 with a pair of the members 32 as predetermined by selecting the position of the brace members 38. If it is desired that the mast be erected to the vertical position the brace members 38 may be removed from the legs 36 and reinserted so that the tongues 44 project outwardly as shown in phantom in FIG. 4 whereby none of the members 32 will be engaged by the tongues as the mast is erected. Handles 50 are provided on the brace members 38 for moving them with respect to the legs 36. Suitable indicia may be placed on the members 38 to indicate the angular position of the mast 18 with respect to the rig 10 for each position of the members with respect to the legs 36.

Referring to FIG. 5, when the mast 18 is raised to the vertical position alternate locking means such as pins, not shown, may be inserted in openings 52 in the frame 12 to project into the path of tabs 54 fixed on the mast. Alternatively, another set of members 32 could be placed still closer to the pivot axis and above the set of members which are engaged with the tongues 44 as shown in FIG. 2. The brace members 38 would need additional apertures for positioning the tongues 44 to engage the aforementioned set of members so that the mast could be locked in the vertical position.

As may be appreciated from the foregoing the angular adjustment mechanism of the present invention provides for preselection of the angular position of the mast wherein prior to raising the mast from the transport position the operator may position the brace members 38 as desired and then proceed to actuate the cylinders 28 to raise the mast until a pair of members 32 automatically become engaged with the tongues 44.

What is claimed is:
1. In a drilling rig:
a frame;
an elongated mast mounted for pivotal movement on said frame from a transport position to a plurality of angular drilling positions between said transport position and a substantially vertical drilling position with respect to said frame;
actuating means connected to said mast for pivotally moving said mast from said transport position to one of said plurality of angular drilling positions; and,
a plurality of stop members disposed on and projecting from opposite lateral sides of said mast and adapted to be engaged by cooperative means disposed on said frame for automatically stopping said mast in a predetermined one of said plurality of angular drilling positions in response to movement of said mast from said transport position toward said vertical drilling position.
2. The invention set forth in claim 1 together with:
locking means engageable with said stop members and said cooperative means for locking said mast in said predetermined one of said plurality of angular drilling positions.
3. The invention set forth in claim 2 wherein:
said cooperative means disposed on said frame comprises a pair of movable members and said plurality of stop members comprise plural pairs of laterally projecting members disposed on said mast and progressively spaced apart radially with respect to the pivot axis of said mast.
4. The invention set forth in claim 3 wherein:
said laterally projecting members comprise lugs each of which include an aperture therein for receiving a portion of said movable member disposed on said frame in response to said mast being moved by said actuating means.
5. The invention set forth in claim 4 wherein:
said means disposed on said frame include spaced apart substantially upstanding legs mounted on said frame adjacent opposite sides of said mast and said movable members include portions mounted on said legs for telescoping movement with respect to said legs.
6. The invention set forth in claim 5 wherein:
said means disposed on said frame includes means for positioning said movable members with respect to said legs whereby a selected pair of said lugs on said mast are engaged by said members in response to movement of said mast by said actuating means.

* * * * *